(12) United States Patent
Al-Bado et al.

(10) Patent No.: US 11,343,819 B2
(45) Date of Patent: May 24, 2022

(54) DEPLOYING AND MANAGING NON-TELCO MOBILE VIRTUAL NETWORK OPERATORS OVER MULTIPLE NSPS

(71) Applicant: DELL PRODUCTS L.P., Round Rock, TX (US)

(72) Inventors: Mustafa Al-Bado, Cork (IE); Thuy Truong, Cork (IE)

(73) Assignee: DELL PRODUCTS L.P., Round Rock, TX (US)

( * ) Notice: Subject to any disclaimer, the term of this patent is extended or adjusted under 35 U.S.C. 154(b) by 115 days.

(21) Appl. No.: 16/867,536

(22) Filed: May 5, 2020

(65) Prior Publication Data

US 2021/0352670 A1 Nov. 11, 2021

(51) Int. Cl.
| | |
|---|---|
| *H04W 36/00* | (2009.01) |
| *H04W 72/04* | (2009.01) |
| *H04L 12/46* | (2006.01) |
| *H04W 76/10* | (2018.01) |
| *H04L 61/5007* | (2022.01) |
| *H04L 47/24* | (2022.01) |

(Continued)

(52) U.S. Cl.
CPC ..... *H04W 72/0453* (2013.01); *H04L 12/4641* (2013.01); *H04L 47/24* (2013.01); *H04L 61/2007* (2013.01); *H04W 36/22* (2013.01); *H04W 48/08* (2013.01); *H04W 76/10* (2018.02); *H04W 84/042* (2013.01); *H04W 88/16* (2013.01)

(58) Field of Classification Search
CPC ............. H04W 72/04; H04W 72/0453; H04W 72/082; H04W 16/10; H04W 16/14; H04W 24/00; H04W 28/16; H04W 28/04; H04W 36/22; H04W 48/08; H04W 76/10; H04W 76/02; H04L 12/4641; H04L 47/24; H04L 61/2007
USPC .................................... 455/436, 450, 452.1
See application file for complete search history.

(56) References Cited

U.S. PATENT DOCUMENTS

| | | | |
|---|---|---|---|
| 2017/0071008 A1* | 3/2017 | Sunay | H04W 72/121 |
| 2017/0264592 A1* | 9/2017 | Yoda | H04L 45/745 |

(Continued)

OTHER PUBLICATIONS

"SLICENET," [online], [Retrieved Oct. 27, 2020], Retrieved from Internet <URL:https://slicenet.eu/> (3pgs).

*Primary Examiner* — Temica M Beamer
(74) *Attorney, Agent, or Firm* — North Weber & Baugh LLP (57) ABSTRACT

Information handling systems and methods for deploying and managing mobile virtual network operators (MVNOs) utilize a MVNO provisioning agent for communicating to a direct access manager resource requests associated with a Radio Access Network (RAN) in a network service provider (NSP). The direct access manager uses the resource requests to allocate resources in one or more RANs. The MVNO provisioning agent RAN receives endpoint information and a confirmation from the direct access manager regarding the allocated resources and passes the information to a MVNO deploying agent that deploys a customized MVNO Evolved Packet Core (EPC) in an EPC container. An MVNO association agent initiates a connection between RAN MVNO agents and the MVNO EPC to connect the deployed MNVO with the NSP, such that resource parameters may be communicated, e.g., in one or more control planes, from the MVNO EPC to the RAN MVNO agent(s) to control the allocated resources.

20 Claims, 7 Drawing Sheets (51) Int. Cl.
*H04W 36/22* (2009.01)
*H04W 48/08* (2009.01)
*H04W 88/16* (2009.01)
*H04W 84/04* (2009.01)

(56) References Cited

U.S. PATENT DOCUMENTS

2017/0287085 A1\* 10/2017 Smith .................. H04W 4/025
2018/0184331 A1\* 6/2018 Samdanis ............ H04W 28/16

\* cited by examiner

DEPLOYING AND MANAGING NON-TELCO MOBILE VIRTUAL NETWORK OPERATORS OVER MULTIPLE NSPS

BACKGROUND

The present disclosure relates generally to information handling system. More particularly, the present disclosure relates to deploying and managing mobile virtual network operators (MVNOs) in network service providers (NSPs).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Today, non-telco MVNOs are limited by NSPs' infrastructure and unable to directly perform certain functions, including activations, receive customer feedback, or obtaining physical information, such as location information or signal strength indication (RSSI) information, etc. Accordingly, it is highly desirable to find new, more efficient ways to deploy non-telco MVNOs over a particular geographical region in a manner so as to enable Digital Service Providers (DSPs)/brokers to have direct access to reserved resources at the NSP level and to allocate, maintain, and manage resources in NSPs on behalf of non-telco MVNOs.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. Each reference/document mentioned in this patent document is incorporated by reference herein in its entirety.

It shall be noted that although embodiments described herein may be within the context of MVNOs, aspects of the present disclosure are not so limited since the teachings of the present disclosure may be performed by other entities that have access to and/or an agreement with an NSP(s), such as, for example, T-mobile. Accordingly, the aspects of the present disclosure may be applied or adapted for use in other contexts.

In current of 4G and 5G network architectures and frameworks such as H2020 SliceNet DSP that propose a DSP access or broker access to reserve resources, such as RAN and core slices, are controlled at the NSP level by a single NSP, also called infrastructure provider. In the 4G and 5G standards, a broker is permitted to reserve and allocate resources from an NSP on behalf of MVNOs. However, such standards do not allow brokers to assume the role of hosting services on behalf of MVNOs. In other words, resources remain under the control of and are managed by the orchestrator. Moreover, the 5G standard does not include a specification that allows brokers, which have experience in reserving, allocating, and managing mobile network resources and services that are typically provided by NSPs despite having no spectrum license, to directly control the NSP resources. Similarly, in the DSP concept proposed in the H2020 SliceNet project, a DSP does not host entities of the MVNO and does not have any control over entities at the NSP level. For instance, in the H2020 SliceNet architecture, NSPs manage the traffic of MVNOs' customers and report Faults, Configuration, Accounting, Performance, Security (FCAP) to the DSP. DSP involvement is requested only in limited cases, such as for handling issues that otherwise cannot be resolved in the NSP level, e.g., single-domain failures and multi-domain handover scenarios. Moving resources from one NSP to another involves complex procedures and requests for resources, such as submitting requests for increased bandwidth for certain users, and handover between RANs or domains are also processed by the NSP.

Accordingly, there is a need for flexibility in managing resources over multiple NSPs without having to rely on a single NSP to allow MVNOs to satisfy required resources and constraints to benefit clients such as, e.g., large conventions (e.g., MWC), Intelligent Transportation System (ITS), etc. Systems and methods presented herein enable deploying and managing non-telco MVNOs on top of multiple NSPs, e.g., in 4G and 5G networks. MVNOs may use third parties, such as brokers or DSPs, to host services of non-telco MVNOs and on their behalf in one or more NSPs. In this manner, brokers/DSPs may achieve QoS in line with NSPs' service-level agreements (SLAs) (e.g., to create, delete, or modify slices) for customers and for various (e.g., mission critical) applications, perform handover operations, prioritize and adjust bandwidth or delay times, etc.) and guarantee transparency of the MVNO, without interfering with other MVNOs' resources.

In embodiments, this is accomplished by employing RAN MVNO agents that receive and apply requests in the network to enable access control over RAN resources, e.g., without revealing to an EPC the details of the RAN in an NSP that may not wish to expose its infrastructure or grant others access to its network topology. In addition to offering automated association of connections between MVNO's EPC and reserved resources in NSPs, various embodiments utilize, based on restrictions provided by the MVNO, RAN MVNO agents, core MVNO agents, an MVNO deployment manager, a DSP-NSP direct access manager, and an MVNO instance manager to enable direct management of MVNOs' reserved resources.

Figure 1:
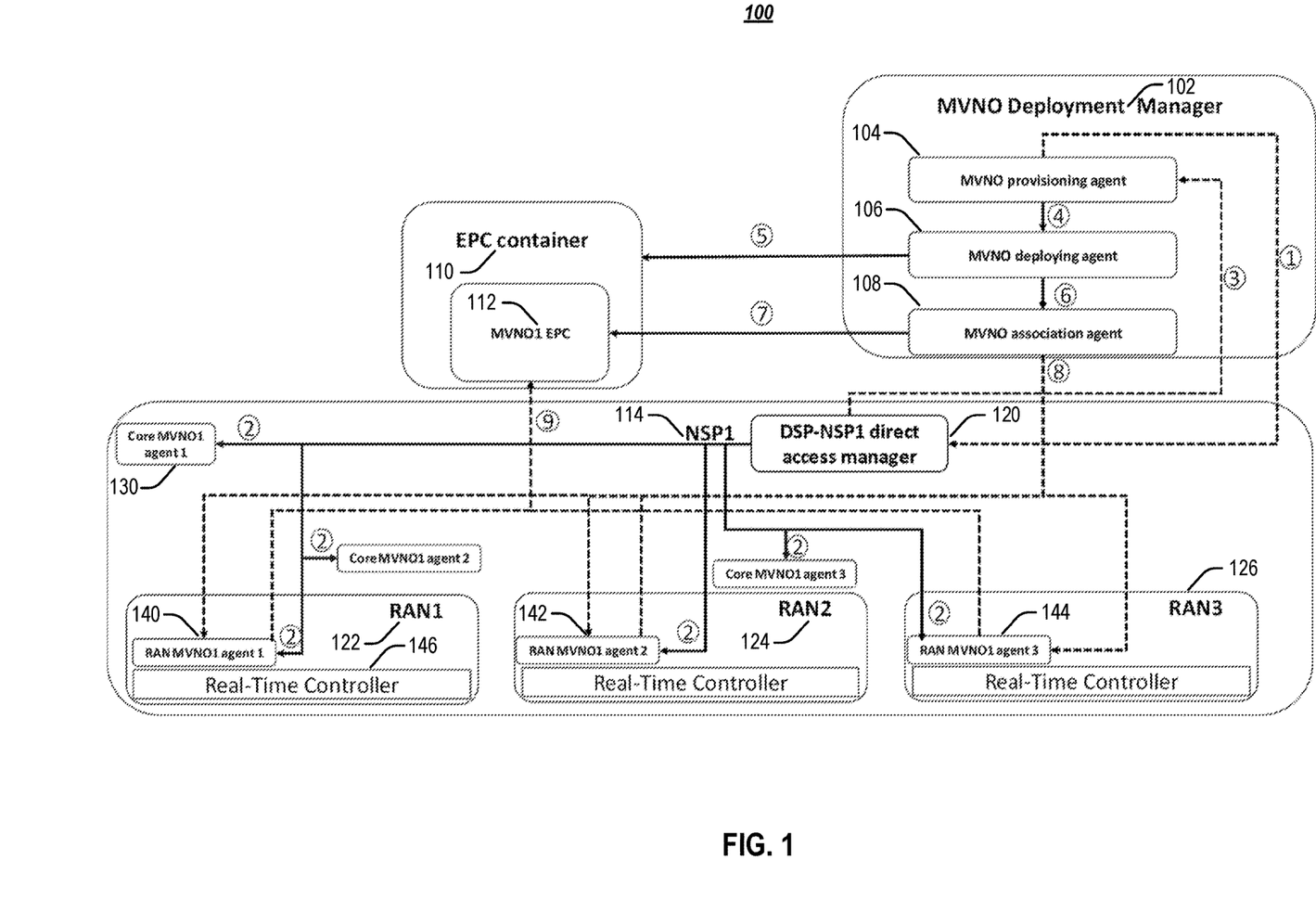
FIG. 1 illustrates an MVNO Evolved Packet Core (EPC) deployment system according to embodiments of the present disclosure.

FIG. 1 illustrates an MVNO EPC deployment system according to embodiments of the present disclosure. As depicted, system 100 may comprise EPC container 110, deployment manager 102, and NSP 114. In embodiments, NSP 114 may comprise core MVNO agent 130, RAN MVNO agents 140-146, and DSP-NSP direct access manager 120, which may be implemented as part of and controlled by NSP 114. MVNO deployment manager 102 may be implemented as part of a DSP/broker orchestrator (not shown in FIG. 1) and may, in embodiments, deploy an MVNO in EPC container 110 that hosts EPC 112 of an MVNO.

In embodiments, MVNO EPC 112 may be coupled to various resources in RAN 122-126, e.g., through core MVNO agent 130 and RAN MVNO agents 140-146, which may be controlled by NSP 114 and, like core MVNO agent 130, may communicate in both a data plane and a control plane.

In operation, RAN MVNO agents 140-146 may apply parameters or changes to parameters that are submitted by an MVNO, e.g., in a manner such as to ensure compliance with the NSP's SLA, and perform access control on RAN slices regarding sensing and actuation. Similarly, core MVNO agent 130 may perform control access on core slices regarding sensing and actuation. In embodiments, RAN MVNO agents 140-146 may be responsible for the association and communication with EPC 110 on behalf of RAN 122-126.

In embodiments, communication between EPC container 110 that hosts a core and RAN MVNO agents 140-146 may utilize pre-defined interfaces, e.g., to control a RAN slice by increasing and decreasing bandwidth for clients, running a particular scheduling algorithm, performing handover operations, and the like. Each RAN MVNO agent (e.g., 140) may provide its handover capabilities such as its X2 handover peers.

In embodiments, DSP-NSP direct access manager 120 may deploy RAN slices and core slices in NSP 114 and provide credentials and details regarding endpoints to MVNO deployment manager 102 that may perform functions comprising: (1) performing provisioning based on offers made by NSPs that may consider, e.g., a covered geographical region, density of customers, and other factors; (2) deploying MVNO EPC 112 in EPC container 110; and (3) associating MVNO EPC 112 with a RAN agent (e.g., 140) of each RAN (e.g., 122) in which the MVNO allocates resources.

In embodiments, RAN MVNO agents 140-146 may perform various forwarding and validation functions for requests by DSP-NSP direct access manager 120. RANs 122-126 may have SDN controllers that create, delete, update slices, and perform handover of resources between RANs 122-126. RANs 122-126 may treat their connection to respective RAN MVNO agents 140-146 as a connection to MVNO EPC 112 such that, in the control plane, RAN MVNO agents 140-146 may act as an EPC for RANs

122-126. Stated differently, RANs 122-126 may connect to RAN MVNO agents 140-146 as if RAN MVNO agents 140-146 were MVNO EPC 112 and vice versa.

In embodiments, information communicated in the control plane from RANs 122-126 to MVNO EPC 112 may comprise user data and connectivity data, such as location information, RSSI information, quality of service (QoS) information, and other information about users that allows an MVNO to control resources for those users without the MVNO having access to information, such as IP addresses and other information that is communicated through the data plane. By limiting the type of information that MVNO EPC 112 has about RANs 122-126 in this manner, NSP 114 that may not wish to expose its infrastructure or grant others access to others to its network topology, e.g., the topology of its SDN controllers, is able to hide details of its actual infrastructure or the environment in which RANs 122-126 operate, their IP address, the type of technology implemented, their nature (e.g., actual versus virtual), and similar information, e.g., in a in a virtual layer that remains invisible to MVNO EPC 112. Advantageously, this provides NSPs (e.g., 114) an incentive to reduce their workload without exposing their network.

It is understood that RANs 122-126 may be controlled by real-time controllers (e.g., 146) that may be used to communicate, e.g., with RAN MVNO agents 140-146. In embodiments, MVNO provisioning agent 104 may send to DSP-NSP direct access manager 120 a list of RANs (e.g., 122) that may have been selected as part of the MVNO1 network. MVNO provisioning agent 104 may further comprise provisioned resource parameters for each RAN 122-126 in NSP 114, such as frequency band, bandwidth, delay, etc. Moreover, the list may comprise core bandwidth, delay constraints (i.e., core slices), and the other components, such as low-latency multi-purpose edge computing and open virtual switch-general packet radio service tunneling protocol.

In embodiments, in response to a provisioning process that may have been initiated by MVNO provisioning agent 104, DSP-NSP direct access manager 120 may deploy a customized RAN MVNO (here, MVNO1). Deployment operations may comprise using MNVO provisioning agent 104 requesting resources from DSP-NSP direct access manager 120, which may use RAN MVNO agents 140-144 and a data plane in system 100 to allocate, request, or create resources, such as core slices, from respective resources at RANs 122-126. It is noted that customization may comprise allocating frequency band, Public Land Mobile Network (PLMN), access methods, and credentials. A person of ordinary skill in the art will appreciate that system 100 may comprise additional or different connections, e.g., connections to network controllers (not shown in FIG. 1). For example, it is understood that any number and type of control signals may be used to facilitate proper communication between components in FIG. 1 to achieve the objectives of the present disclosure.

In embodiments, DSP-NSP direct access manager 120 may send confirmation regarding a resource reservation and information about endpoints (e.g., RAN MVNO agents 140-144 and core MVNO agent 130) to MVNO provisioning agent 104 to confirm that deployment has commenced. MVNO provisioning agent 104 may pass the endpoint information and EPC specifications to MVNO deploying agent 106, e.g., to enable MVNO deploying agent 104 to deploy customized MVNO EPC 112 in EPC container 110. Deployment may involve using configuration information, such as gateway information in the data plane, interface information for setting up MVNO agents 130 and RAN MVNO agents 140-146, and other information related to endpoints, such as IP addresses, port number, credential information. In embodiments, MVNO deploying agent 106 may pass some or all of the EPC and RAN endpoint-related information to MVNO association agent 108, e.g., to initiate a connection between MVNO EPC 112 and the MNVO RANs 122-126 in NSP 114 using, e.g., the credential information, IP and location information, and configuration information.

In embodiments, MVNO association agent 108 may invoke connections between RAN MVNO agents 140-146 and MVNO EPC 112, e.g., to connect the deployed MNVO with NSP 114. In addition, each RAN MVNO agent 140-146 may establish its respective control plane communication with MVNO EPC 112, e.g., to communicate resource parameters from EPC 112 to MVNO RAN agents 140-144.

Figure 2:
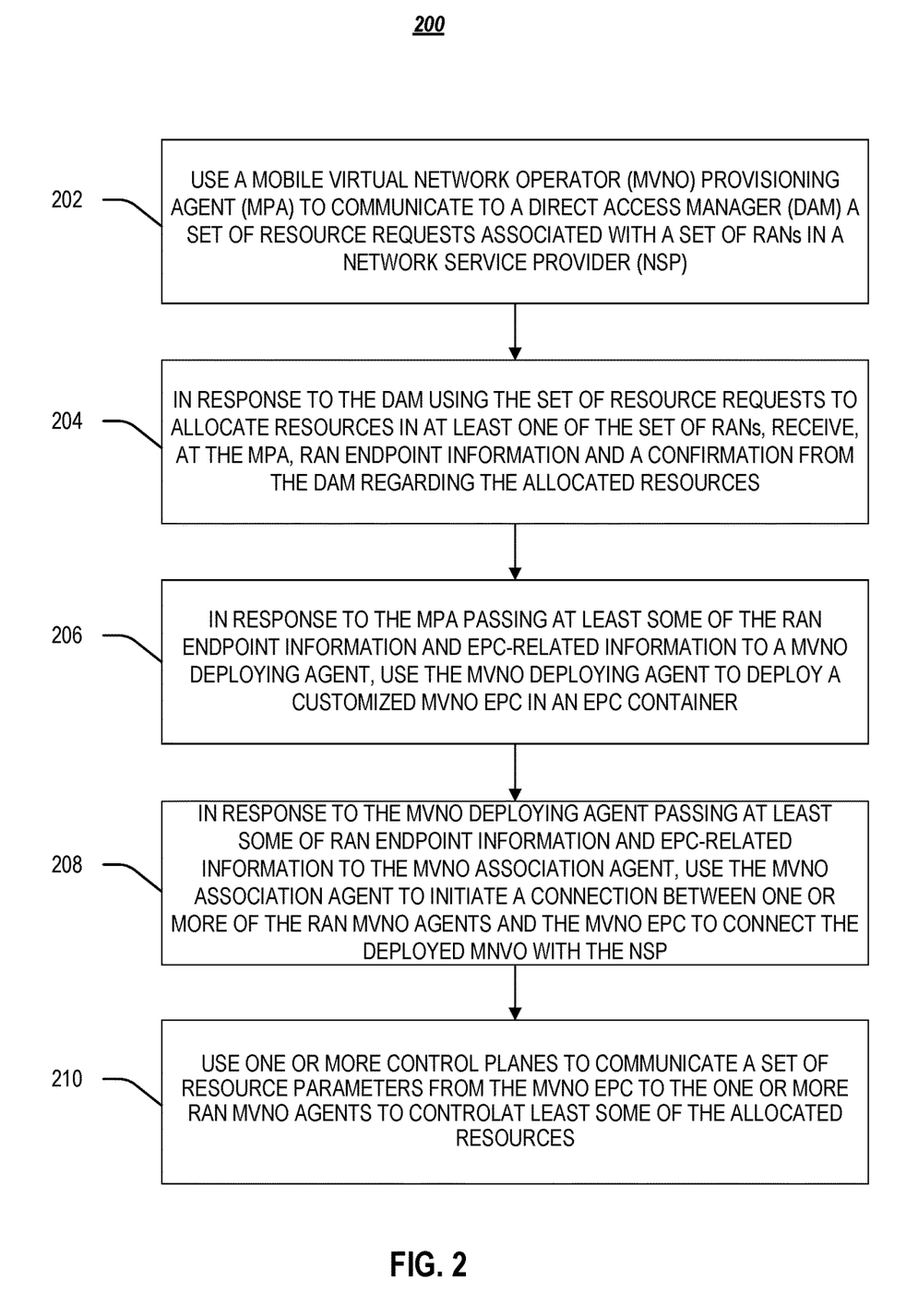
FIG. 2 depicts an MVNO EPC deployment process and an exemplary association between an EPC and RANs in a DSP according to embodiments of the present disclosure.

FIG. 2 depicts an MVNO EPC deployment process and an exemplary association between an EPC and RANs in a DSP according to embodiments of the present disclosure. In embodiments, process 200 may begin when a MVNO provisioning agent communicates (202) to a direct access manager a resource request(s) associated with a RAN(s), which may be located in an NSP. In embodiments, in response to the direct access manager using the resource request, RAN endpoint information and a confirmation from the direct access manager regarding the allocated resources may be received (204), e.g., at the MVNO provisioning agent. In embodiments, in response to the MVNO provisioning agent passing the RAN endpoint information and EPC-related information to a MVNO deploying agent, the MVNO deploying agent may be used to deploy (206) a customized MVNO EPC in an EPC container. In embodiments, in response to the MVNO deploying agent passing at least some of the RAN endpoint information and the EPC-related information to the MVNO association agent, the MVNO association agent may be used to initiate (208) a connection between one or more RAN MVNO agents and the MVNO EPC to connect the deployed MNVO with the NSP. Finally, a number of control planes may be used to communicate (210) a set of resource parameters from the MVNO EPC to the one or more RAN MVNO agents to control the allocated resources.

Figure 3:
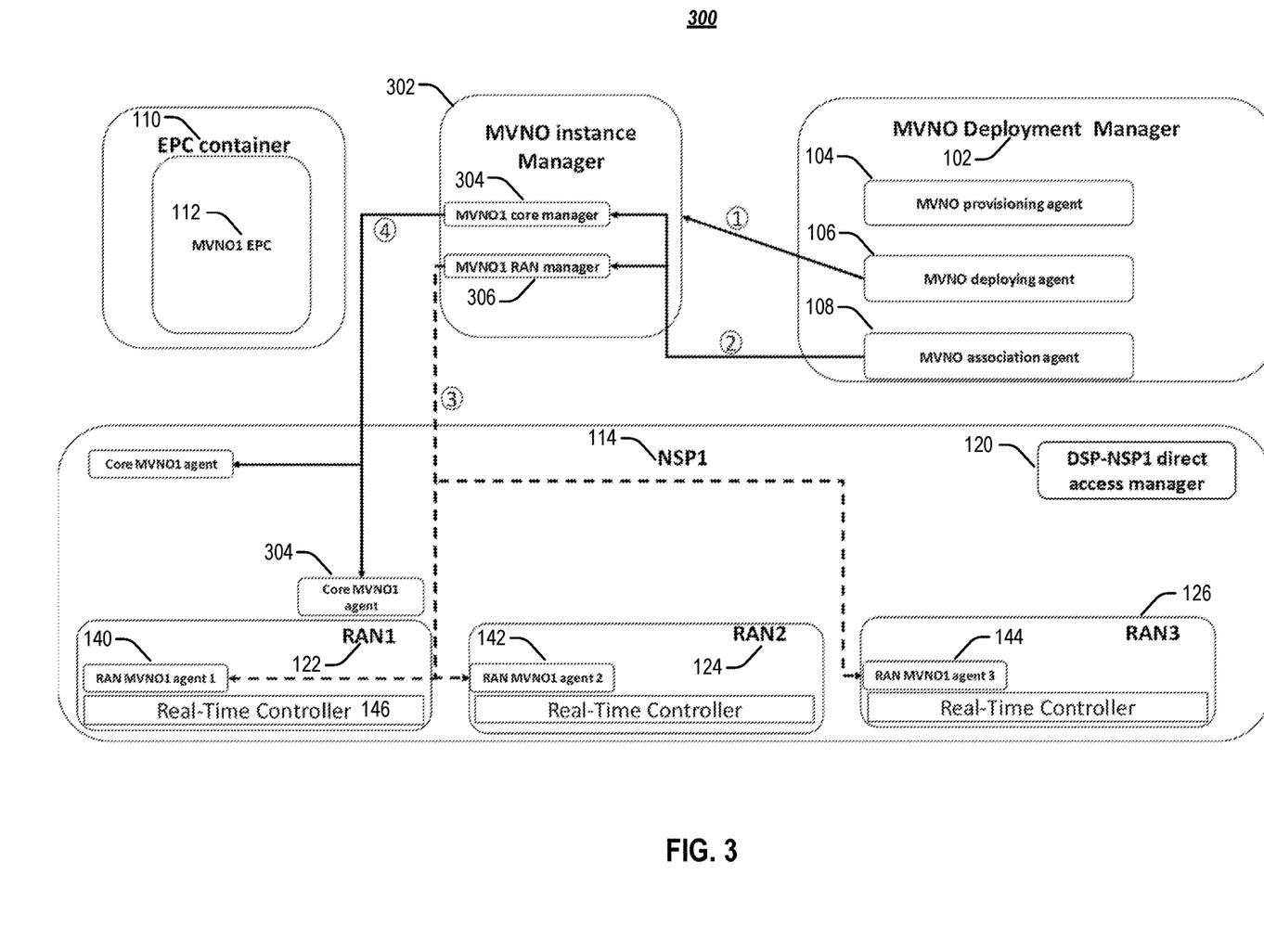
FIG. 3 depicts a system for MVNO core and Radio Access Network (RAN) manager deployment and an exemplary association between MVNO core manager and MVNO RAN manager with respective core MVNO and RAN MVNO agents, according embodiments of the present disclosure.

FIG. 3 depicts a system for MVNO core and RAN manager deployment and an exemplary association between MVNO core manager and MVNO RAN manager with respective core MVNO and RAN MVNO agents, according embodiments of the present disclosure. For clarity, components similar to those shown in FIG. 1 are labeled in the same manner. For purposes of brevity, a description or their function is not repeated here. As depicted in FIG. 3, system 100 may comprise EPC container 110, MVNO deployment manager 102, MVNO instance manager 310, and NSP 114 that may comprise core MVNO agents 303, 304, RAN MVNO agents 140-146, and DSP-NSP direct access manager 120. MVNO EPC 112 may be coupled to various resources, e.g., through core MVNO agent 304 and RAN MVNO agents 140-146.

In embodiments, MVNO instance manager 302 comprises MVNO core manager 304 and MVNO RAN manager 304 that, in operation, may communicate information from MVNO deployment manager 102 to RAN MVNO 122-126 in NSP 114. In embodiments, MVNO deployment manager 102 may send credentials to MVNO instance manager 302 to take control and manage resources. MVNO deploying agent 106 may be used to deploy customized MVNO core manager 304 and MVNO RAN manager 306 in MVNO instance manager 302.

In embodiments, in response to MVNO association agent 108 starting MVNO core manager 312 and MVNO RAN manager 314, MVNO core manager 304 may establish connections with core MVNO agent 304, and MVNO RAN manager 306 may establish connections with RAN MVNO agents 140, 142. Core MVNO agent 304 may perform control access on core slices regarding sensing and actuation. Core MVNO agent 304 may further perform association and communication with MVNO core manager 304 on behalf of the core. Core MVNO agent 304 may be deployed at several locations within NSP 114, e.g., in a way that allows a DSP to run software defined networking (SDN) operations to its reserved resources without affecting other network traffic. MVNO instance manager 302 may be part of a DSP orchestrator and manage resources on behalf of an MVNO, e.g., by enforcing QoS and performing handover and load balancing. As mentioned previously, a DSP or broker rather than NSP 114 may be responsible for managing an MVNO's reserved resources.

It is understood that one of the goals of NSP 114 is to satisfy the SLA with the DSP, which may include satisfying dedicated bandwidth and delay parameters at both the core side and the RAN side. It is further understood that both NSPs and DSPs may comprise existing orchestration, datalake, and FCAPs components that operate, e.g., based on standards such as European Telecommunications Standards Institute (ETSI) and International Telecommunication Union-Telecommunication Standardization Sector (ITU-T), and that may be integrated with and utilize one or more methods and components disclosed herein, such as MVNO deployment manager 102, EPC container 110, and MVNO instance manager 302 to deploy MVNOs or non-telco MVNOs that delegate their control functions to brokers/DSPs.

Figure 4:
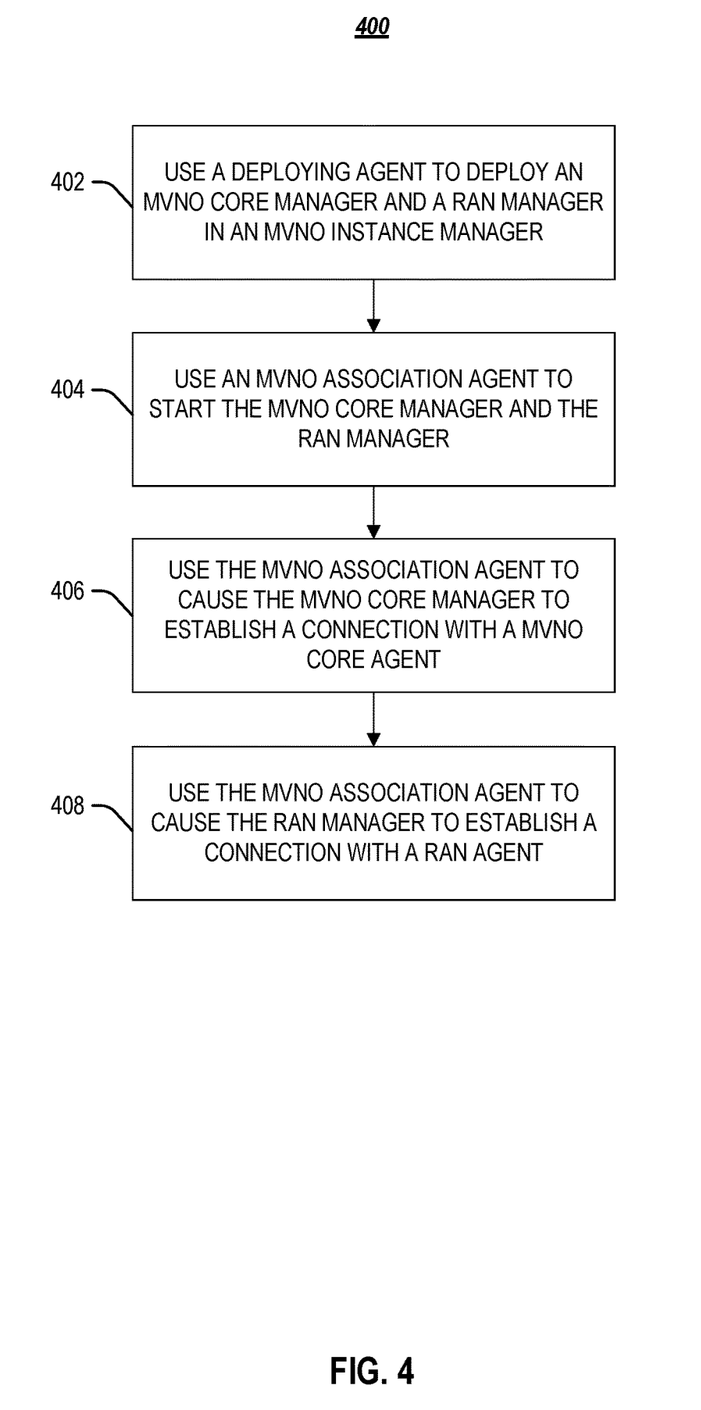
FIG. 4 depicts a process for MVNO core and RAN manager deployment and an exemplary association between MVNO core manager and MVNO RAN manager with respective core MVNO and RAN MVNO agents, according embodiments of the present disclosure.

FIG. 4 depicts a process for MVNO core and RAN manager deployment and an exemplary association between MVNO core manager and MVNO RAN manager with respective core MVNO and RAN MVNO agents, according embodiments of the present disclosure.

In embodiments, process 400 may begin when, a deploying agent is used to deploy (402) an MVNO core manager and a RAN manager in an MVNO instance manager. In embodiments, an MVNO association agent may be used to start (404) the MVNO core manager and the RAN manager. The MVNO association agent may then be used (406) to cause the MVNO core manager to establish a connection with a MVNO core agent. Finally, the MVNO association agent may be used (408) to cause the RAN manager to establish a connection with a RAN agent. It shall be noted that: (1) certain steps herein may optionally be performed; (2) steps may not be limited to the specific order set forth herein; (3) certain steps may be performed in different orders; and (4) certain steps may be done concurrently.

Figure 5:
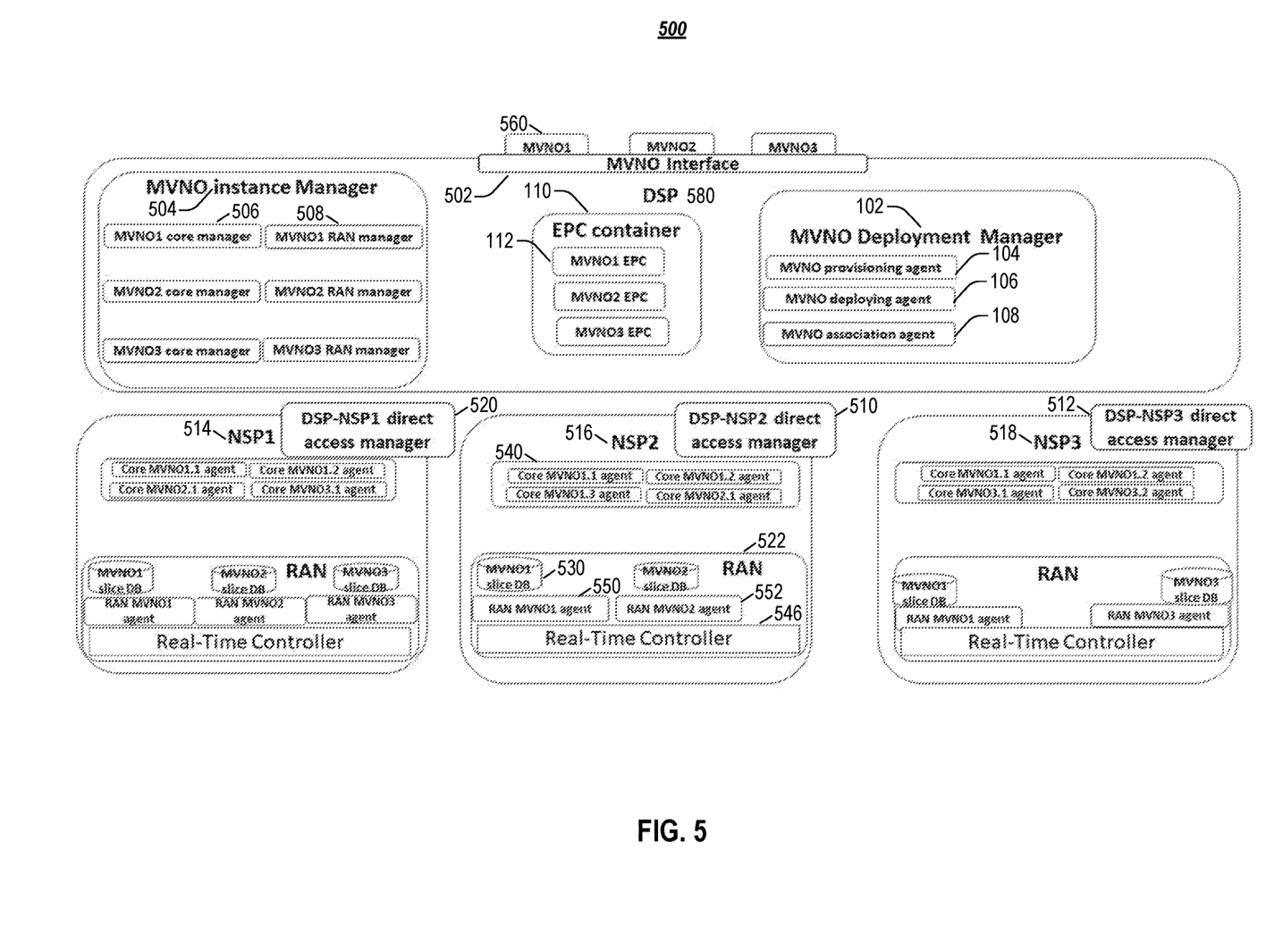
FIG. 5 depicts an exemplary architecture utilizing multi-tenant multi-NSP components according to embodiments of the present disclosure.

FIG. 5 depicts an exemplary architecture utilizing multi-tenant multi-NSP components according to embodiments of the present disclosure. Similar numerals as in FIG. 1 denote similar elements. In operation, in embodiments, MVNO deploying agent 106 may deploy an EPC instance in EPC container 110 for a target MVNO, e.g., MVNO1 EPC 112, and host the EPC instance in EPC container 110.

As depicted in FIG. 5, each MVNO (e.g., MVNO1 560), may have its own RAN agent (e.g., MVNO1 RAN agent 550) that, in turn, may have its own control planes coupled to the three RANs 122, 124, and 126, such that one RAN may be shared by two or more MVNOs akin to two networks sharing a same router. As mentioned earlier, MVNO instance manager 504 may connect EPC 112 with MVNO RAN agent (e.g., 550) over NSPs 514-518. Then, MVNO instance manager 504 may set up a communication between the SDN-based controllers (e.g., 546) in DSP 580 and MVNO core agents (e.g., 540).

In embodiments, RAN MVNO agents (e.g., 550) may grant DSP 580 access to the MVNO's allocated RAN resources at the NSP-level without impacting the RAN resources of other MVNOs. In embodiments, DSP-NSP direct access manager 520 may create core MVNO agents (e.g., 540), and DSPs/brokers may request core MVNO agents to provide flexibility for controlling MVNOs' traffic, such as handover between RANs, e.g., in two or more multi-domain networks 514-518. In embodiments, requests to core MVNO agents (e.g., 540) may comprise requests for controlling (e.g., prioritizing) traffic, which the MVNO agents may facilitate by communicating, e.g., to a set of SDN controllers (not shown). Allocating resources may comprise initiating connections in the control plane between slice resources, such as RANs (e.g., 522) and switches (also not shown), and core MVNO agents (e.g., 540) and RAN MVNO agents (e.g., 550). For example, each RAN 122-126 may have its own control plane to EPC (e.g., 112), such that each MVNO (e.g., 560) may have a dedicated control plane with each RAN 122-126 that an MVNO reserves resources on.

In practice, an MVNO may specify the type of requested services or resources, such as geographical coverage, delay, QoS, expected number of customers, and NSP peers. Once DSP 580 receives, e.g., offers and measurements regarding NSPs' geographical coverage, DSP 580 may allocate the requested resources in NSPs 514-518, e.g., based on provisioning performed by MVNO deployment manager 102. NSPs 514-518 may create core MVNO agents (e.g., 540) and RAN MVNO agents (e.g., 550) at each RAN (e.g., 522) or core resources (e.g., switches) that facilitate DSP traffic. In embodiments, DSP-NSP direct access managers (e.g., 520) may provide RAN MVNO agents (e.g., 550) with restrictions and access credentials and may further provide DSP 580 with endpoint information (e.g., RAN MVNO agent 550 and core MVNO agent 540) and credential information to facilitate opening secure communication paths (tunnels).

In embodiments, NSPs 514-518 may offer services to DSP 580 with a level of detail that allows DSP 580 to establish a common slice (e.g., 530) or sub-slice between peer NSPs, e.g., between 514 and 516. In such embodiments, once the slice has been established between peer NSPs, it may be managed by DSP 580. In embodiments, orchestrators within NSPs 514-518 may be used to manage links between peer NSPs (e.g., 514 and 516).

A person of skill in the art will appreciate that, in embodiments, the functions of one or more core MVNO agents (e.g., 540) may be performed by a single core MVNO agent implemented in system 500.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 6:
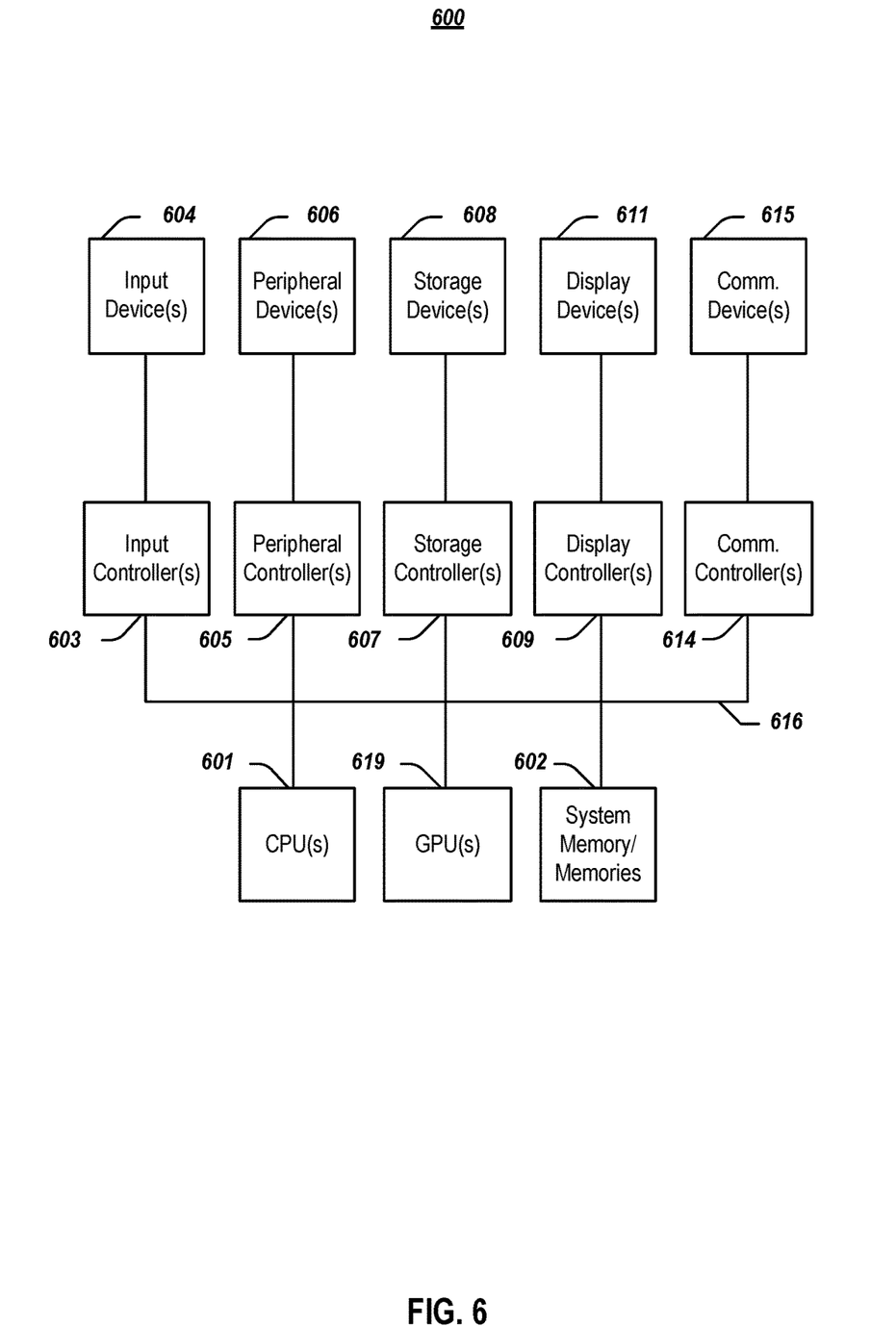
FIG. 6 depicts a simplified block diagram of an information handling system according to embodiments of the present invention.

FIG. 6 depicts a simplified block diagram of an information handling system (or computing system) according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 619 and/or a floating-point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT), a thin film transistor (TFT) display, organic light-emitting diode, electroluminescent panel, plasma panel, or other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 7:
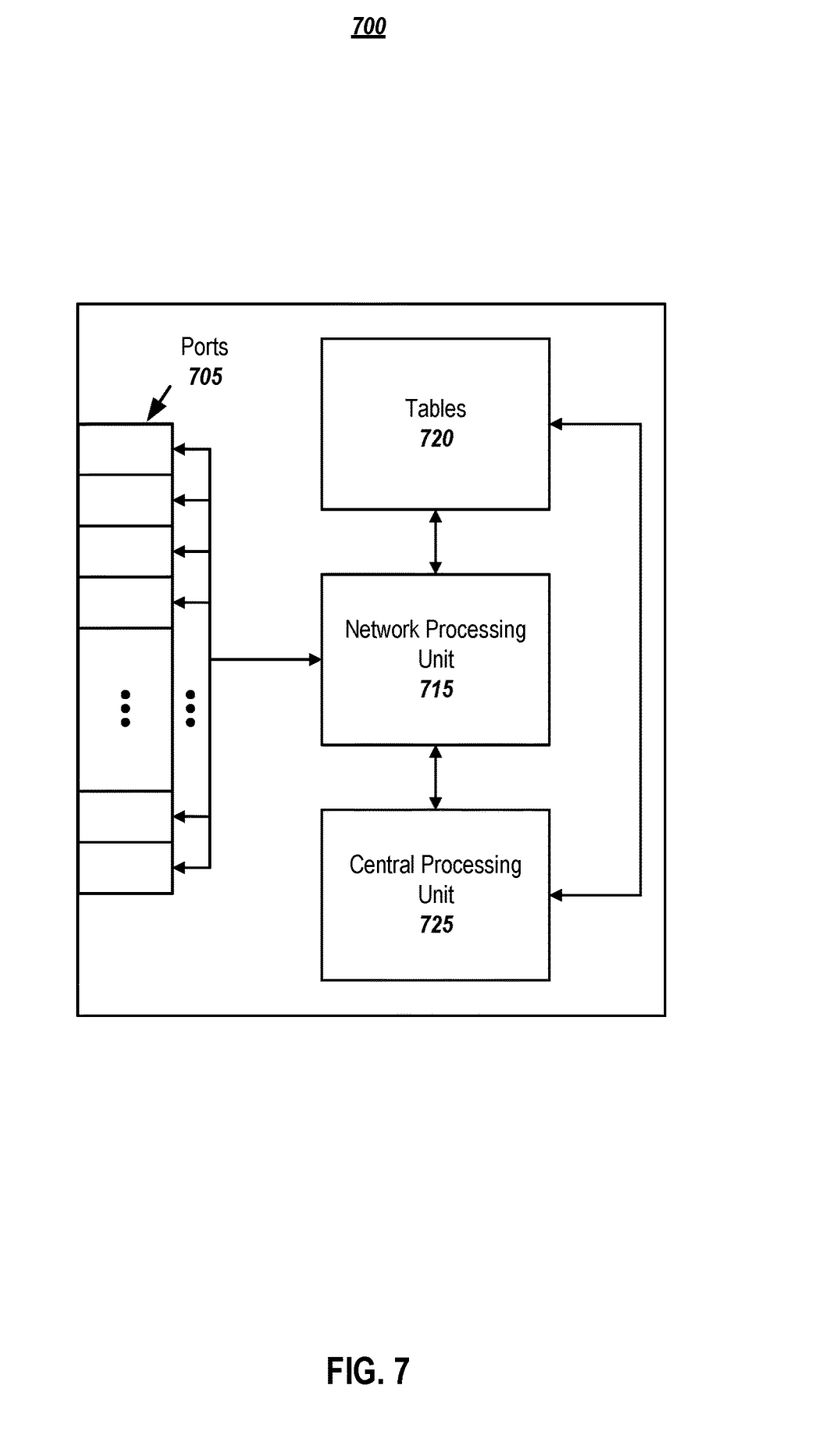
FIG. 7 depicts an alternative block diagram of an information handling system, according to embodiments of the present disclosure.

FIG. 7 depicts an alternative block diagram of an information handling system, according to embodiments of the present disclosure. It will be understood that the functionalities shown for system 700 may operate to support various embodiments of the present disclosure—although it shall be understood that such system may be differently configured and include different components (including fewer or more components).

The information handling system 700 may include a plurality of I/O ports 705, a network processing unit (NPU) 715, one or more tables 720, and a central processing unit (CPU) 725. The system includes a power supply (not shown) and may also include other components, which are not shown for sake of simplicity.

In one or more embodiments, the I/O ports 705 may be connected via one or more cables to one or more other network devices or clients. The network processing unit 715 may use information included in the network data received at the node 700, as well as information stored in the tables 720, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An information handling system for deploying and managing mobile virtual network operators (MVNOs), the information handling system comprising:
   one or more processors; and
   a non-transitory computer-readable medium or media comprising one or more sets of instructions which, when executed by at least one of the one or more processors, causes steps to be performed comprising:
      using an MVNO provisioning agent to communicate to a direct access manager a set of resource requests associated with a set of Radio Access Networks (RANs) in one or more network service providers (NSPs);
      in response to the direct access manager using the set of resource requests to allocate resources in at least one of the set of RANs, receiving, at the MVNO provisioning agent, RAN endpoint information and a confirmation from the direct access manager regarding the allocated resources;
      in response to the MVNO provisioning agent passing the RAN endpoint information and Evolved Packet Core (EPC)-related information to an MVNO deploying agent, using the MVNO deploying agent to deploy a customized MVNO EPC in an EPC container;
      in response to the MVNO deploying agent passing at least some of the RAN endpoint information and the EPC-related information to an MVNO association agent, using the MVNO association agent to initiate a connection between one or more RAN MVNO agents and the MVNO EPC to connect the deployed MNVO with the NSP; and
      using one or more control planes to communicate a set of resource parameters from the MVNO EPC to the one or more RAN MVNO agents to control the allocated resources.

2. The information handling system of claim 1, wherein the set of resource parameters comprises at least one of a frequency band, a core bandwidth, and a delay constraint, and wherein the EPC-related information comprises a set of EPC specifications.

3. The information handling system of claim 1, wherein the confirmation comprises information regarding a deployment having commenced.

4. The information handling system of claim 1, wherein deploying the customized MVNO EPC comprises assigning at least one of a Public Land Mobile Network (PLMN), an allocated frequency band, an access method, and credential information.

5. The information handling system of claim 1, wherein deploying the customized MVNO EPC further comprises exchanging configuration information that comprises at least one of gateway information in a data plane and interface information for setting up MVNO agents and the one or more RAN MVNO agents.

6. The information handling system of claim 1, wherein initiating the connection between the one or more RAN MVNO agents and the MVNO EPC comprises using at least one of credential information, an IP address, and location information.

7. The information handling system of claim 1, wherein, in response to a deploying agent deploying an MVNO core manager and a RAN manager in an MVNO instance manager and an MVNO association agent starting the MVNO core manager and the RAN manager, the core MVNO agent causes the MVNO core manager to establish a connection with a MVNO core agent and causes the RAN manager to establish a connection with a RAN agent.

8. The information handling system of claim 1, further comprising a DSP or broker that facilitates a handover between resources in two or more NSPs.

9. An information handling system for deploying and managing mobile virtual network operators (MVNOs), the information handling system comprising:
   an Evolved Packet Core (EPC) container coupled to an MVNO deployment manager;
   an MVNO provisioning agent that receives from a direct access manager coupled with the MVNO deployment manager a set of resource requests associated with a set of Radio Access Networks (RANs) in one or more network service providers (NSPs), RAN endpoint information, and a confirmation, the direct access manager uses the set of resource requests to allocate resources in at least one of the set of RANs;
   an MVNO deploying agent that is coupled with the MVNO deployment manager, the MVNO deploying agent receives from the MVNO provisioning agent the RAN endpoint information and EPC-related information, the MVNO deploying agent deploying a customized MVNO EPC in the EPC container;
   an MVNO association agent that receives from the MVNO deploying agent at least some of the RAN endpoint information and the EPC-related information and initiates a connection between one or more RAN MVNO agents and the MVNO EPC to connect the deployed MNVO with the NSP; and one or more control planes to communicate a set of resource parameters from the MVNO EPC to the one or more RAN MVNO agents to control the allocated resources.

10. The information handling system of claim 9, wherein the MVNO provisioning agent provisions the set of resource parameters.

11. The information handling system of claim 9, wherein the one or more RAN MVNO agents establish the control planes.

12. The information handling system of claim 9, further comprising a direct access manager that, in one or more control planes, initiates connections between at least some of the allocated resources.

13. The information handling system of claim 12, wherein the direct access manager creates an MVNO agent to control traffic.

14. The information handling system of claim 13, wherein the direct access manager controls traffic by prioritizing at least some of the traffic by communicating with a set of SDN controllers.

15. The information handling system of claim 9, further comprising a DSP or broker that facilitates a handover between resources in two or more NSPs.

16. A non-transitory computer-readable medium or media comprising one or more sequences of instructions which, when executed by at least one processor, causes steps to be performed comprising:

using an MVNO provisioning agent to communicate to a direct access manager a set of resource requests associated with a set of Radio Access Networks (RANs) in one or more network service providers (NSPs);

in response to the direct access manager using the set of resource requests to allocate resources in at least one of the set of RANs, receiving, at the MVNO provisioning agent, RAN endpoint information and a confirmation from the direct access manager regarding the allocated resources;

in response to the MVNO provisioning agent passing the RAN endpoint information and EPC-related information to an MVNO deploying agent, using the MVNO deploying agent to deploy a customized MVNO EPC in an Evolved Packet Core (EPC) container;

in response to the MVNO deploying agent passing at least some of the RAN endpoint information and the EPC-related information to an MVNO association agent, using the MVNO association agent to initiate a connection between one or more RAN MVNO agents and the MVNO EPC to connect the deployed MNVO with the NSP; and using one or more control planes to communicate a set of resource parameters from the MVNO EPC to the one or more RAN MVNO agents to control the allocated resources.

17. The non-transitory computer-readable medium or media of claim 16, wherein the set of resource parameters comprises at least one of a frequency band, a core bandwidth, and a delay constraint, and wherein the EPC-related information comprises a set of EPC specifications.

18. The non-transitory computer-readable medium or media of claim 16, wherein deploying the customized MVNO EPC comprises assigning at least one of a Public Land Mobile Network (PLMN), an allocated frequency band, an access method, and credential information.

19. The non-transitory computer-readable medium or media of claim 16, wherein deploying the customized MVNO EPC comprises exchanging configuration information that comprises at least one of gateway information in a data plane and interface information for setting up MVNO agents and the one or more RAN MVNO agents.

20. The non-transitory computer-readable medium or media of claim 16, wherein initiating the connection between the one or more RAN MVNO agents and the MVNO EPC comprises using at least one of credential information, an IP address, and location information.

\* \* \* \* \*